United States Patent
Uchigaki

(10) Patent No.: US 6,389,358 B2
(45) Date of Patent: May 14, 2002

(54) VEHICLE-MOUNTED NAVIGATION DEVICE

(75) Inventor: Yuichiro Uchigaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/752,769

(22) Filed: Jan. 3, 2001

Related U.S. Application Data

(63) Continuation of application No. PCT/JP99/02620, filed on May 19, 1999.

(51) Int. Cl.$^7$ ............................................ G06F 165/00
(52) U.S. Cl. ..................... 701/209; 73/178 R; 340/990; 701/200; 701/211
(58) Field of Search .......................... 701/209, 211, 701/213, 200; 340/990, 995; 73/178 R

(56) References Cited

U.S. PATENT DOCUMENTS

| | | | | |
|---|---|---|---|---|
| 5,206,811 A | * | 4/1993 | Itoh et al. ................. | 701/211 |
| 5,274,387 A | * | 12/1993 | Kakihara et al. ........... | 342/451 |
| 5,293,163 A | * | 3/1994 | Kakihara et al. ........... | 340/995 |
| 5,559,511 A | * | 9/1996 | Ito et al. .................... | 340/995 |
| 5,617,319 A | * | 4/1997 | Arakawa et al. ............ | 701/207 |
| 5,729,217 A | * | 3/1998 | Ito et al. .................... | 340/988 |
| 5,732,385 A | * | 3/1998 | Nakayama et al. .......... | 701/201 |
| 5,751,228 A | * | 5/1998 | Kamiya et al. .............. | 340/988 |
| 5,774,073 A | * | 6/1998 | Maekawa et al. ........... | 340/995 |
| 5,908,464 A | * | 6/1999 | Kishigami et al. .......... | 701/208 |
| 5,938,719 A | * | 8/1999 | Arakawa et al. ............ | 701/207 |
| 5,964,821 A | * | 10/1999 | Brunts et al. ............... | 701/201 |
| 6,034,626 A | * | 3/2000 | Maekawa et al. ........... | 340/995 |
| 6,049,755 A | * | 4/2000 | Lou et al. ................... | 701/207 |
| 6,122,592 A | * | 9/2000 | Arakawa et al. ............ | 701/201 |
| 6,141,014 A | * | 10/2000 | Endo et al. ................. | 345/427 |
| 6,169,552 B1 | * | 1/2001 | Endo et al. ................. | 345/427 |
| 6,175,801 B1 | * | 1/2001 | Millington .................. | 701/207 |
| 6,178,380 B1 | * | 1/2001 | Millington .................. | 701/212 |

FOREIGN PATENT DOCUMENTS

| | | |
|---|---|---|
| JP | 5-45885 | 7/1993 |
| JP | 7-35566 | 2/1995 |
| JP | 8-220993 | 8/1996 |
| JP | 8-233594 | 9/1996 |
| JP | 9-254752 | 10/1997 |
| JP | 9-304101 | 11/1997 |
| JP | 10-89990 | 4/1998 |

* cited by examiner

Primary Examiner—William A. Cuchlinski, Jr.
Assistant Examiner—Olga Hernandez

(57) ABSTRACT

A vehicle-mounted navigation device comprises an image display means which performs guiding of a direction of travel only by display of an arrow when a vehicle is running on a guided route and which performs map display instead of said arrow display when said vehicle is off the guided route.

8 Claims, 4 Drawing Sheets

VEHICLE-MOUNTED NAVIGATION DEVICE

CROSS-REFERENCE TO THE RELATED APPLICATION

This application is a continuation of international Application No. PCT/JP99/02620, whose international filing date is May 19, 1999, the disclosures of which Application are incorporated by reference herein.

BACKGROUND OF THE INVENTION

1. Field of the Invention

The present invention relates to a vehicle-mounted navigation device. More particularly, the present invention relates to a vehicle-mounted navigation device, which performs indication of a route by a map or by an arrow indicating the direction of travel of an automobile.

2. Description of Related Art

FIG. 1 is a block diagram showing a construction of a conventional vehicle-mounted navigation device. In the figure, reference numeral 1 denotes a GPS receiver. The GPS receiver 1 demodulates data from electronic waves received by an antenna 2 mounted on the vehicle and calculates a present position of the vehicle by processing such data. 3 is a CPU which inputs vehicle positional data from the GPS receiver 1 and applies corrections to the vehicle positional data based on the output of a gyroscope and a vehicle speed sensor (not shown). 4 is a CD-ROM in which secondary information data such as map data, distance between expressway interchanges and expressway tolls are recorded in a fixed format. 5 is an input device which operates the navigation device on the basis of the key input of a user. 6 is a display device which displays vehicle positional information and map information received from the CPU 3.

The operation of the conventional vehicle-mounted navigation device will be explained below.

FIG. 2 is a flowchart showing the operation of the conventional vehicle-mounted navigation device. When the vehicle-mounted navigation device is started by a key operation from the input device 5, the CPU 3 initializes the system and uptakes data with respect to the present position of the vehicle from the GPS receiver 1. Then, map data containing the present position of the vehicle is read out from the CD-ROM 4 and is displayed on the display 6 together with the vehicle present position (step ST1). A route from a present position to a destination is searched on the basis of the data to the destination input by the input device 5. The searched route is then displayed on the map.

Arrow data indicating a direction of travel may be stored in the CD-ROM 4 instead of map data and only an arrow indicating the direction of travel by the vehicle in its present position may be displayed based on the searched route.

Since the conventional vehicle-mounted navigation device is constructed as above, it is difficult to read the display contents quickly if the display screen is not large when a vehicle position is always displayed on a map. As a result, it is necessary to increase the screen size of the display device which increases the size of the device and its cost. Furthermore, in a case where the direction of travel is indicated by an arrow, display contents can be read out quickly. However, the problem has arisen that it is not possible to have detailed information in the periphery of the guided route.

SUMMARY OF THE INVENTION

The present invention is proposed to solve the above problems and has the object of providing a vehicle-mounted navigation device which can provide detailed information regarding the proximity of the destination and the proximity of the guided route to a user by simply guiding the direction of travel only by an arrow under normal condition and by shifting to indication by a map instead of the arrow under specific conditions such as when running off-route or when setting a destination, thereby to improve an ability of providing information.

A vehicle-mounted navigation device according to the present invention comprises a memory means for storing map data, a position measurement means for measuring a present position of a vehicle, a calculation means for calculating a guided route from a present position to a destination and for selecting display of the guided route on the map read out from the memory means or display of an arrow showing a direction of travel of the vehicle, and an image display means for displaying the selected display contents.

By such an arrangement, it is possible to simply guide the direction of travel only by an arrow when the vehicle is running and thus reduce the burden of the driver. Furthermore, since the display contents may be understood accurately even if the display screen is small, a small sized screen may be used which reduces the size of the display device and reduces the cost thereof.

According to the present invention, the image display means may be adapted to display an arrow indicating the direction of travel of the vehicle under normal condition and perform map display when the vehicle is running off the guided route.

In such a way, detailed information regarding the proximity of the guided route can be provided to a user, thereby to improve an ability of providing information which is needed to understand a present position accurately.

According to the present invention, the image display means may be adapted to display an arrow indicating the direction of travel of the vehicle under normal condition and perform map display when setting a destination.

In this way, detailed information from a present position to a destination is provided to a user, as a result, it is possible to improve an ability of providing information which is needed to accurately set a guided route to the destination.

According to the present invention, the image display means may be adapted to display an arrow indicating the direction of travel of the vehicle under normal condition and perform map display when the vehicle is in the environs of the destination.

In this way, detailed information regarding the environs of the destination is provided to a user and it is possible to improve an ability of providing information which is needed to accurately understand the destination.

According to the present invention, the image display means may be adapted to display an arrow indicating the direction of travel of the vehicle under normal condition and perform map display for a predetermined period of time in response to an input operation by a user.

In this way, the present position and detailed information along the guided route can be obtained according to the preference of the user.

DETAILED DESCRIPTION OF THE PREFERRED EMBODIMENTS

The preferred embodiments of the present invention will be explained below with reference to the accompanying figures.

Embodiment 1

Figure 1:
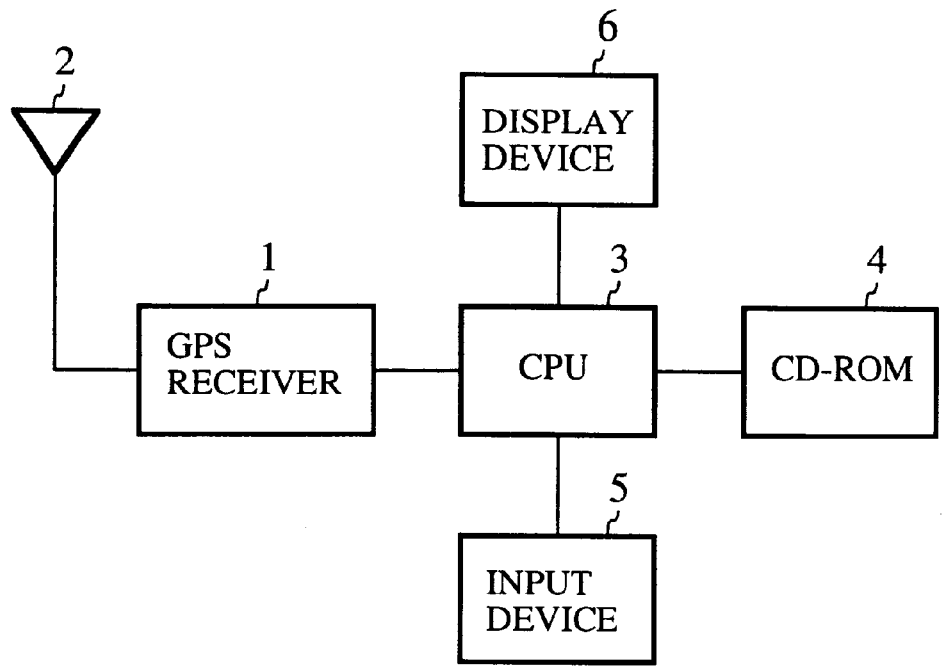
FIG. 1 is a block diagram showing a construction of a conventional vehicle-mounted navigation device.
Figure 2:
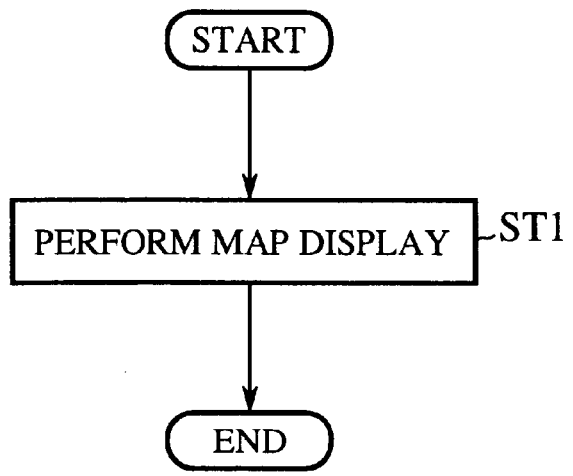
FIG. 2 is a flowchart showing the operation of the conventional vehicle-mounted navigation device.
Figure 3:
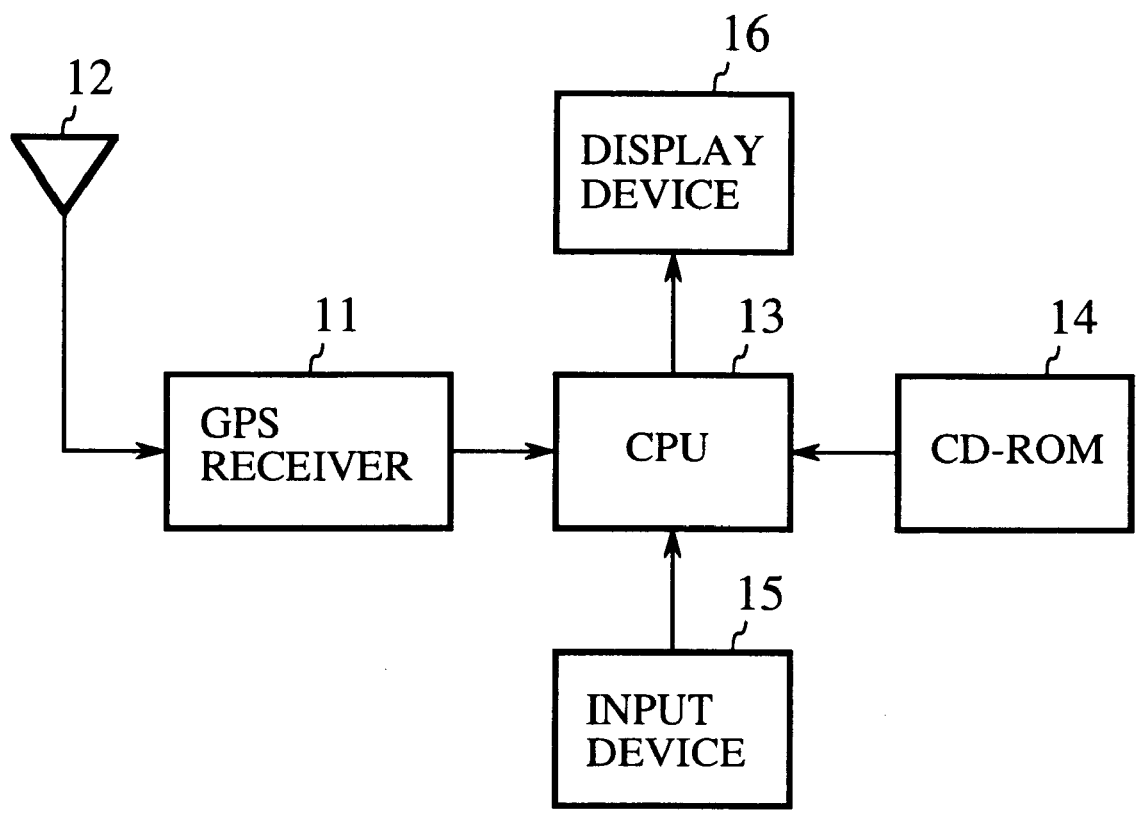
FIG. 3 is a block diagram showing a construction of a vehicle-mounted navigation device according to the present invention.

FIG. 3 is a block diagram showing a construction of a vehicle-mounted navigation device according to the present invention. In FIG. 3, reference numeral 11 denotes a GPS receiver (position measuring means) which measures a present position based on a GPS signal from an antenna 12. 12 is a GPS receiving antenna, 13 is a CPU (calculation means) which searches a guided route to a destination based on an input data and displays the guided route on a map or displays an arrow indicating a direction of travel of a vehicle. 14 is a CD-ROM (memory means) in which arrow data showing a direction of travel and map data is recorded in a fixed format. The arrow data may be generated from the map data on the basis of a calculation instead of being recorded in the CD-ROM. Data relating to the shape and size of the arrow to be displayed may also be recorded in the CD-ROM or the ROM provided in the CPU.

15 is an input device for inputting an activation signal of the vehicle-mounted navigation device to the CPU 13 by a key operation or the like and for inputting a mode selection signal which selects either displaying a map or displaying an arrow indicating a direction of travel. 16 is a display device which displays a guided route as well as a map or which displays only an arrow indicating a direction of travel of the vehicle instead of the map.

The operation of the vehicle-mounted navigation device according to the present invention will be discussed below.

Figure 4:
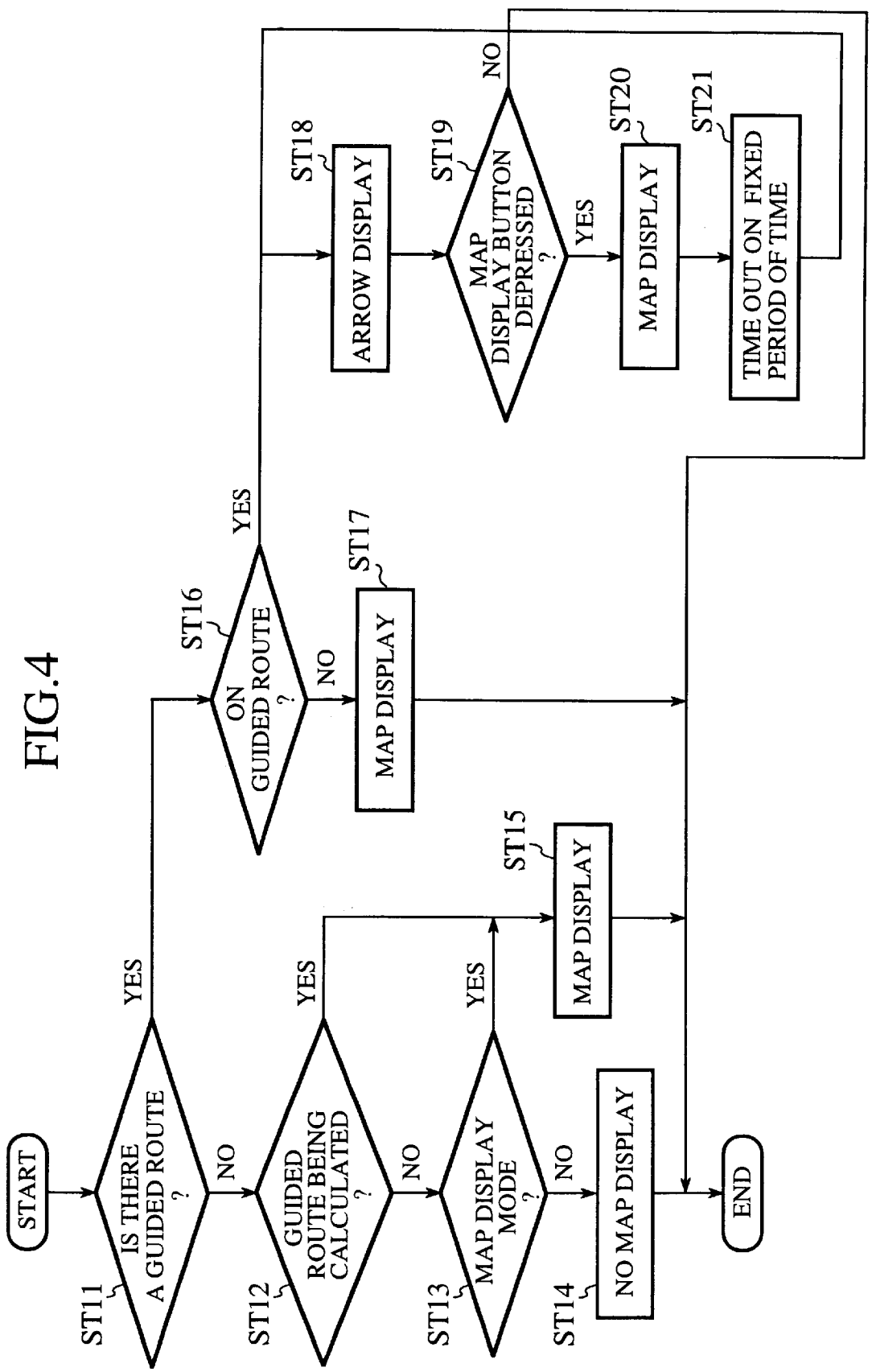
FIG. 4 shows the display of the vehicle-mounted navigation device according to the present invention.
Figure 5:
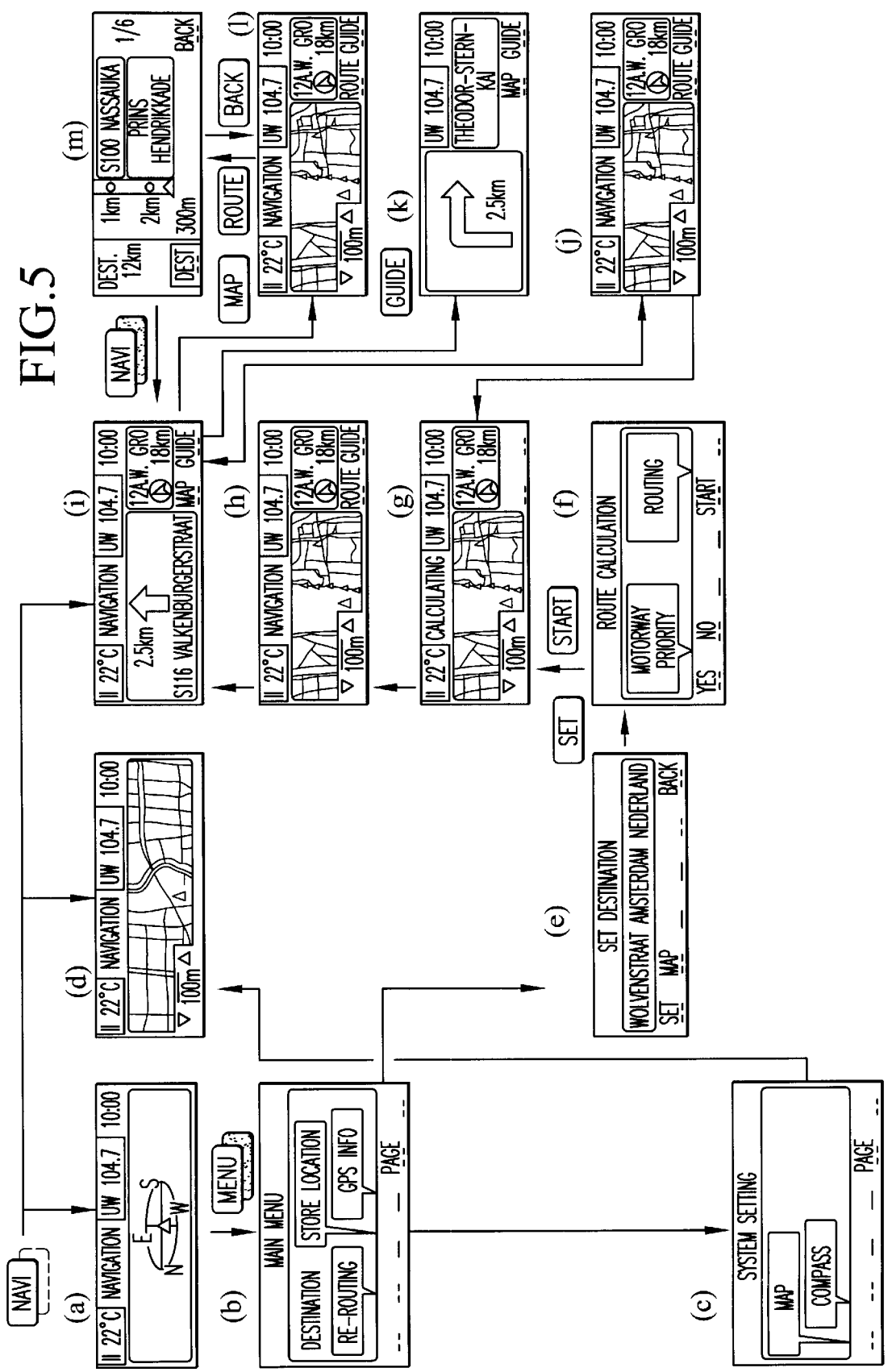
FIG. 5 is a flowchart explaining the operation of the vehicle-mounted navigation device according to the present invention.

FIG. 4 is a flowchart explaining the operation of the vehicle-mounted navigation device according to the present invention. FIG. 5 is a diagram showing the display of the display device 16. Firstly, when the device is activated, the display screen of the display device 16 is as shown in FIG. 5(a). By pushing the "MENU" key, the display screen changes to that as shown in FIG. 5(b). In this state, when the "Page" key is pushed, the display screen changes to that as shown in FIG. 5(c). Next, by pushing the "Map" key, the display screen changes to that as shown in FIG. 5(d) and the map is displayed.

On the other hand, if the screen is as shown in FIG. 5(b) and the "Destination" key is pushed, the display screen changes to that shown in FIG. 5(e). When the "Set" key is pushed, the display screen changes to that shown in FIG. 5(f) and the preparation of the screen is completed.

When the "Start" key is pushed, the display screen changes to that shown in FIG. 5(g) and it is decided whether there is a guided route (step ST11). If the result of the decision is NO, the display screen changes to that shown in FIG. 5(h), and then it is decided whether a guided route is currently being calculated (step ST12). If the result of the decision is NO, it is decided whether the device is in a map display mode (step ST13). If the result of the decision is NO, the map is not displayed (step ST14). On the other hand, if the result of the decision in the steps ST12 and ST13 is YES, the display screen changes to that shown in FIG. 5(h) and a map is displayed (step ST15).

When the result of the decision in the steps ST11 is YES, it is decided whether the present position of the vehicle is on the guided route (step ST16). If the result of the decision is NO, map display as in the display screen in FIG. 5(h) is continued (step ST17). On the other hand, if the result of the decision is YES, an arrow indicating a direction of travel is displayed instead of the map as shown in the display screen of FIG. 5(i) (step ST18). When the "Map" key on the display screen of FIG. 5(i) is pushed (step ST19), the display screen changes to that shown in FIG. 5(j) and the map is displayed (step ST20). When a fixed period of time has elapsed (step ST21), the routine returns to the step ST19.

As shown above, according to the first embodiment, when a present position of the vehicle is on the guided route, an arrow indicating a direction of travel is displayed on a display screen. As a result, it is possible to guide the direction of travel simply by only an arrow when the vehicle is running.

Embodiment 2

In a state where the arrow is displayed as shown in FIG. 5(i), the screen display changes to that shown in FIG. 5(h) with a map display if the vehicle position deviates from the guided route. The screen display immediately reverts to the screen display shown in FIG. 5(h) if the vehicle position returns to the guided route. However, if a predetermined period of time elapses, the screen display returns to that as shown in FIG. 5(g) and a calculation is performed to realign the vehicle position with the guided route. By pushing the "Guide" key on the screen display shown in FIG. 5(i), the screen display changes to that shown in FIG. 5(l) and the direction of turning at the next intersection and the distance from the present position to the next intersection are displayed. Further, by pushing the "Route" key on the screen display shown in FIG. 5(l) which displays the map, the screen display changes to that shown in FIG. 5(m) and place names along a guided route and distances thereto are displayed. During this type of display, if the "Back" key is pushed, the display contents may be scrolled.

Thus, according to the second embodiment, it is possible to provide detailed information regarding the proximity of a destination and the proximity of a guided route to user by displaying a map instead of an arrow under the specific condition such as when a vehicle is running off the guided route or when setting a destination, thereby to improve an ability of providing information.

As shown above, the vehicle-mounted navigation device of the present invention is adapted to display only an arrow indicating a direction of travel on a screen display when a vehicle is running on a guided route and is adapted to display a map instead of the arrow when this is not the case. Therefore, it is possible to easily recognize the display contents during running. Furthermore, it is possible to provide detailed information regarding the proximity of the guided route as required.

What is claimed is:

1. A vehicle-mounted navigation device comprising:
   a memory means for storing map data and arrow data;
   a position measuring means for measuring a present position of a vehicle;
   a calculation means and an image display means for calculating a guided route from the present position to a destination and for selecting the displaying of said guided route from the present position to a destination and for selecting the displaying of said guided route on a map read out from said memory means and displaying an arrow indicating a direction of travel of the vehicle wherein the arrow can indicate the direction of travel with a map background and without a map background; and said image display means for displaying the selected display contents, wherein said image display means displays the arrow indicating the direction of travel of the vehicle under normal condition and performs map display for a predetermined period of time in response to an input operation by a user.

2. A vehicle-mounted navigation device according to claim 1, wherein said image display means displays the arrow indicating the direction of travel of the vehicle under normal condition and performs map display when the vehicle is running off the guided route.

3. A vehicle-mounted navigation device according to claim 1, wherein said image display means displays the arrow indicating the direction of travel of the vehicle under normal condition and performs map display when setting the destination.

4. A vehicle-mounted navigation device according to claim 1, wherein said image display means displays the arrow indicating the direction of travel of the vehicle under normal condition and performs map display when the vehicle is positioned near the destination.

5. A vehicle-mounted navigation device comprising:

a display;

a memory;

a position sensor; and a processor coupled to the display, the memory, and the position sensor, the memory storing map data and arrow data, the processor configured to calculate a guided route from a present position to a destination;

select for presentation on the display one of the guided routes on a map read from the memory, and an arrow indicating a direction of travel of the vehicle wherein the arrow can indicate the direction of travel with a map background and without a map background; and display the selected one, wherein the processor is further configured to display the arrow indicating the direction of travel of the vehicle under normal conditions and outputting for display the map for a predetermined period of time in response to an input operation.

6. The vehicle-mounted navigation device according to claim 5, wherein the processor is further configured to output to the display the arrow indicating the direction of travel of the vehicle under normal conditions and output for display the map when the vehicle is traveling on the guided route.

7. The vehicle-mounted navigation device according to claim 5, wherein the processor is further configured to output for display the arrow indicating the direction of travel of the vehicle under normal conditions and outputting for display the map when setting the destination.

8. The vehicle-mounted navigation device according to claim 5, wherein the processor is further configured to output for display the arrow indicating the direction of travel of the vehicle under normal conditions and outputting for display the map when the vehicle is positioned near the destination.

* * * * *